3,558,715
BIS(PENTABROMOCYCLOPENTADIENYL) AND METHOD OF MAKING THE SAME

Carleton W. Roberts and Stanley D. McGregor, Midland, Mich., assignors to The Dow Chemical Company, Midland, Mich., a corporation of Delaware
No Drawing. Filed Aug. 2, 1968, Ser. No. 749,589
Int. Cl. C07c 17/24, 23/24
U.S. Cl. 260—648                                   1 Claim

ABSTRACT OF THE DISCLOSURE

The invention concerns bis(pentabromocyclopentadienyl), a new compound having the empirical formula $C_{10}Br_{10}$ and relates to a method of making the same.

---

This invention concerns bis-pentabromocyclopentadienyl) a new chemical compound having an empirical formula of $C_{10}Br_{10}$, and relates to a method of making the same.

The new compound has been found to occur in the coupling reaction of hexabromocyclopentadiene with bromine and aluminum bromide to form a compound having the empirical formula $C_{10}Br_{12}$. The preparation of $C_{10}Br_{12}$ requires prolonged, e.g. 48 to 72 hours, refluxing of the reaction mixture in order to obtain reasonable conversion and good yields of the product. However, if the reaction is terminated short of complete reaction of the $C_5Br_6$ to form $C_{10}Br_{12}$, the compound $C_{10}Br_{10}$ can be recovered from the reaction mixture.

The new compound having the empirical formula $C_{10}Br_{10}$ and melting at about 140° C. to 142° C. is useful as the active ingredient in bactericidal and fungicidal spray compositions.

A preferred method for making the compound $C_{10}Br_{10}$ is to carry out the reductive coupling of $C_5Br_6$ by reacting two moles of $C_5Br_6$ with one another in admixture with finely divided metallic copper, e.g. powdered copper of pigment grade, and an organic solvent or reaction medium such as ethyl alcohol, or a mixture of ethyl alcohol and benzene. The ethyl alcohol can be either absolute or 95%. The reaction can be carried out at temperatures between about 0° and 100° C. and at atmospheric or superatmospheric pressure.

The following examples illustrate ways in which the principle of the invention has been applied but are not to be construed as limiting its scope.

EXAMPLE 1

A charge of 473 grams of hexabromocyclopentadiene was placed in a glass reaction vessel equipped with a reflux condenser and stirrer. A charge of 800 ml. of liquid bromine was added. The mixture was stirred. A charge of 105 grams of anhydrous aluminum bromide was added. The resulting mixture was stirred and heated at a refluxing temperature for a period of 45 hours. Thereafter, water was added dropwise while stirring and in an amount sufficient to kill the catalytic activity of the aluminum bromide. The excess bromine was removed by steam distilling. The residue was a dark brown viscous liquid. The liquid was extracted with hot hexane. The residue was a dark brown solid. The solid was recrystallized from a mixture of tetrahydrofuran and hexane. There was obtained 120 grams of pure $C_{10}Br_{12}$. The hexane washings or extract of the dark brown viscous liquid was passed through a bed of silica gel of 200 mesh per inch particle size as determined by U.S. Standard screens and contained in a 2-inch diameter by 24 inches long glass tube. A portion of the effluent liquid was cooled to separate crystalline product. After three recrystallizations, the crystalline material was found to have a melting point of 111–115° C. A mass spectographic analysis indicated the material was a mixture of hexabromocyclopentadiene and another material. The hexabromocyclopentadiene was removed by subjecting the mixture to sublimation at 105° C. and about 0.1 mm. absolute pressure for a period of 15 hours. The residue was dissolved in benzene then was mixed with about an equal volume of hexane and allowed to stand at room temperature for 24 hours. Thereafter, the crystalline material was separated. It melted at 140–142° C. Mass spectographic analysis indicated the material to be homogeneous, and to be a product having an empirical formula of $C_{10}Br_{10}$.

EXAMPLE 2

This example demonstrates the preferred method of a reductive coupling reacting of hexabromocyclopentadiene to produce the product bis(pentabromocyclodienyl) having an empirical formula of $C_{10}Br_{10}$.

A charge of 43.2 grams of hexabromocyclopentadiene, 100 ml. of absolute ethyl alcohol, 50 ml. of benzene and 5 ml. of water were placed in a glass reaction vessel equipped with a stirrer. The mixture was stirred and heated at 45° C. A charge of 5.08 grams of finely divided (pigment grade) copper was added over a period of about 5 minutes. After fifteen minutes longer, the copper powder appeared to be completely reacted. The resulting mixture was stirred for 16 hours at 40–45° C. Thereafter, the volatile material was removed under vacuum. The residue consisting of about 48 grams of material was extracted with three 200 ml. portions of methylene chloride. The methylene chloride solution was washed with two 100 ml. portions of 0.1 normal aqueous sulfuric acid solution, then with water, and was dried over anhydrous magnesium sulfate. The dried liquid was evaporated to dryness under vacuum. There was obtained 42 grams of residue. It was a mixture of $C_5Br_6$ and $C_{10}Br_{10}$. The mixture was dissolved in 400 ml. of hot heptane. The solution was passed over a bed of silica gel in a chromatographic column and eluted with n-heptane. There was obtained a first fraction of 5 grams of $C_5Br_6$ and a second fraction of 27.4 grams of $C_{10}Br_{10}$ melting at 140.5–142° C.

EXAMPLE 3

In tests of the bis(pentabromocyclopentadienyl) having an empirical formula of $C_{10}Br_{10}$ and melting at 140.5–142° C., prepared in Example 2 as the active ingredient in spray compositions, containing 100 parts of the compound per million parts of the spray, it was found to be 100 percent effective or to kill bacteria and fungi as follows:

| Bacteria: | Control, percent |
| --- | --- |
| Candida albicans | 100 |
| Pseudomonas aeroginosa | 100 |
| Salmonella typhosa | 100 |
| Trichophyton mentagrophytes | 100 |
| Bacillus subtilis | 100 |

| Fungi: | Control, percent |
|---|---|
| Candida pelliculosa | 100 |
| Pullularia pullulans | 100 |
| Aspergillus terrens | 100 |
| Rhizopus nigricans | 100 |

In contrast, the compound bis(pentachlorocyclopentadienyl) having an empirical formula of $C_{10}Cl_{10}$ when tested in bactericidal and fungicidal spray compositions in concentrations of 100 parts by weight of said compound per million parts by weight of the composition, was found to be ineffective and have no control of the bacteria or the fungi.

We claim:
1. Bis(pentabromocyclopentadienyl) a compound having an empirical formula of $C_{10}Br_{10}$.

References Cited

Ungnade et al.: Chem. Rev. 58, 283 (1958).
McBee et al.: J. Am. Chem. Soc. 77, 4375–4379 (1955).
Kwitowski et al.: J. Am. Chem. Soc. 88, 4541 (1966).

DANIEL D. HORWITZ, Primary Examiner

U.S. Cl. X.R.
424—352